United States Patent
Xiong et al.

(10) Patent No.: US 12,457,671 B1
(45) Date of Patent: Oct. 28, 2025

(54) DRIVER AND LUMINAIRE HAVING A SINGLE POWER INPUT TERMINAL AND WIDE INPUT VOLTAGE RANGE

(71) Applicant: Litetronics International, Inc., Bedford Park, IL (US)

(72) Inventors: Wei Xiong, Madison, AL (US); Robert C Sorensen, Bedford Park, IL (US)

(73) Assignee: Litetronics International, Inc., Bedford Park, IL (US)

( * ) Notice: Subject to any disclaimer, the term of this patent is extended or adjusted under 35 U.S.C. 154(b) by 4 days.

(21) Appl. No.: 19/014,121

(22) Filed: Jan. 8, 2025

Related U.S. Application Data

(63) Continuation-in-part of application No. 18/734,112, filed on Jun. 5, 2024.

(51) Int. Cl.
    H05B 45/355 (2020.01)
    H05B 45/36 (2020.01)
    H05B 45/3725 (2020.01)

(52) U.S. Cl.
    CPC ........... *H05B 45/355* (2020.01); *H05B 45/36* (2020.01); *H05B 45/3725* (2020.01)

(58) Field of Classification Search
    CPC .................. H05B 45/355; H05B 45/36; H05B 45/3725–385; H05B 45/34–345
    See application file for complete search history.

(56) References Cited

U.S. PATENT DOCUMENTS

| | | | |
|---|---|---|---|
| 11,297,703 B1* | 4/2022 | Zhou | H05B 45/10 |
| 2014/0153306 A1* | 6/2014 | Pan | H02M 1/4225 |
| | | | 323/210 |
| 2014/0300274 A1* | 10/2014 | Acatrinei | H05B 45/3578 |
| | | | 315/122 |
| 2022/0039234 A1* | 2/2022 | Hsia | H02M 3/33523 |

* cited by examiner

*Primary Examiner* — Renan Luque
(74) *Attorney, Agent, or Firm* — Steve Witters; Witters & Associates

(57) ABSTRACT

Technologies are described for a driver and a luminaire having a driver in electrical connection with at least one LED. The driver has a single power input terminal and wide input voltage range, wherein the wide input voltage range of the driver is between about 100V and 528V. The driver is configured to supply power to the at least one LED at a substantially constant current or at a substantially constant voltage.

15 Claims, 13 Drawing Sheets

DRIVER AND LUMINAIRE HAVING A SINGLE POWER INPUT TERMINAL AND WIDE INPUT VOLTAGE RANGE

CROSS REFERENCE TO RELATED APPLICATIONS

This application claims priority to U.S. patent application Ser. No. 18/734,112, filed on Jun. 5, 2024, entitled "A SINGLE STAGE BUCK BOOST TYPE LED DRIVER", which is incorporated by reference herein in its entirety.

FIELD OF INVENTION

The present invention relates to a driver and luminaire having a single power input terminal and wide input voltage range.

BACKGROUND

LED lighting is the mainstream nowadays in the lighting market. LED lighting has the advantages of super long life, easy to dim, easy to drive, and mercury free. LED is a current driven device that means the current of LED must be regulated by a driver to avoid running away. Most of the LED drivers in the market have a certain input voltage or voltage range, for example, 120-277V, 347V, 480V, or 347V-480V.

For a luminaire designer, LEDs are a very highly efficient light source, but if a driver does not have high efficiency, the total system efficiency may not be high. Therefore, it may be desirable to have a driver that has high efficiency to improve the total system lumen/watt efficacy.

LEDs also last a long time or have a long lifespan, if they don't overheat. To take advantage of this attribute, it is also desirable to have a long-life LED driver that may last about 10-15 years.

Long-life and high efficiency go side by side for the luminaire and driver. If the efficiency of the driver is good, the power loss is low, which means that the internal temperature of the driver will be low. When the operating temperature of semiconductors is low, they last long. Also, high efficiency helps decrease the size of the mechanical enclosure of the LED driver and reduce the thermal relief potting material, lowering the total system cost.

Currently, drivers and luminaires are designed to be powered with a specific voltage, or voltage range. Most of the luminaires on the market have LED drivers with a certain input voltage or voltage range, for example, 120-277V, 347V, 480V, or 347V-480V. Alternatively, luminaires may have more than a single power input terminal. For example, a luminaire may have a first power input terminal configured to accept a first input voltage or voltage range and a second power input terminal configured to accept a second input voltage or voltage range. These luminaires require inventorying a variety of luminaires configured for specific voltages, or, require the installer to select a correct power input terminal for installation with the provided power supply.

It may be desirable to have an LED driver or a luminaire with an LED driver that has a single power input terminal and wide input voltage range between about 100V and about 528V, or between about 120V and about 480V.

SUMMARY

In at least one embodiment of the present disclosure, A luminaire has a driver, at least one LED in electrical connection with the driver, the driver has a single power input terminal and wide input voltage range, wherein the wide input voltage range of the driver is between about 100V and 528V, and the driver is configured to supply power to the at least one LED at a substantially constant current or at a substantially constant voltage.

In at least other embodiment of the present disclosure, a luminaire has at least one LED, a driver configured and disposed to supply power to the at least one LED at a substantially constant current or at a substantially constant voltage, the driver has a single power input terminal and wide input voltage range between about 100V and 528V, the driver is configured to supply power to the at least one LED at a substantially constant current or at a substantially constant voltage and comprises: an output current regulation circuit configured to control an output current to match a control signal, DIM_command, a power factor correction (PFC) control circuit having a digital compensation block, a PFC controller, and a gate drive IC; wherein the PFC control circuit is configured and disposed to force an input AC current to track an input voltage waveform and to sense a rectified input voltage from a full-wave rectifier, MULT_in, and process it in a digital core of an uC, and output a new compensated MULT signal, MULT_out, for the PFC controller, and a passive voltage multiplier circuit disposed between the full-wave rectifier and an input of the PFC controller and configured to sense the input voltage waveform.

In at least one additional embodiment of the present disclosure, a light emitting diode (LED) driver is configured for powering an LED having a wide input voltage range between about 100V and about 528V, high power factor, low total harmonic distortion (THD), and low output current ripple load. The LED driver has a single stage buck-boost type converter with output current regulation. An output current regulation circuit is configured to control an output current to match a control signal, DIM_command. A ripple control circuit has a transient voltage suppressor (TVS) and a parallel resonant LC filter and is configured and disposed to receive DC current output by the single stage buck-boost type converter, take advantage of the high impedance at resonance, reduce the size of the resonant LC filter, improve efficiency, and minimize the output current ripple content. A power factor correction (PFC) control circuit having a digital compensation block, a PFC controller, and a gate drive IC, the PFC control circuit is configured and disposed to: (i) force an input AC current to track an input voltage waveform and achieve high power factor (PF) and a low THD; (ii) sense a rectified input voltage from a full-wave rectifier, MULT_in, and process it in a digital core of an uC, and output a new compensated MULT signal, MULT_out, for the PFC controller; and (iii) limit a maximum frequency of a gate drive signal, Gate_out, to reduce switching loss, improve efficiency, and improve electromagnetic interference. A passive voltage multiplier circuit is disposed between the full-wave rectifier and an input of the PFC controller and configured to sense the input voltage waveform. The input AC current has the same waveform as input voltage, achieving the high power factor and the low THD.

In at least one further embodiment of the present disclosure, a light emitting diode (LED) driver is configured for powering at least one LED and has a wide input voltage range between about 100V and about 528V. The LED driver has a single stage buck-boost type power factor correction (PFC) front end and a digital compensation block in communication with the PFC. The digital compensation block is configured and disposed to: i) create a new multiply signal for a PFC control integrated circuit to improve a total harmonic distortion and a power factor for the buck-boost type PFC front end; ii) adaptively convert a signal (MULT_in) that is proportional to an input voltage to a nonlinear reference signal (MULT_out) for peak switching current, wherein the nonlinear reference signal cancels a nonlinear factor in an average input current and forces the average input current to follow the input voltage waveform to achieve high power factor and low THD; and iii) to be insensitive to a magnitude of the input voltage magnitude and solely compensate phase information for the nonlinear reference signal. A digital maximum switching frequency limiting circuit is configured and disposed to reduce switching loss, improve efficiency, and improve electromagnetic interference. A simple counting logic counter is configured and disposed to sense and count a period of a switching cycle from a PFC IC, wherein upon the counted period of the switching becoming less than a set counter period, a uC forces a gate drive to wait until the counted period of the switching period exceeds the set counter period which limits a maximum switching frequency. A line frequency ripple control circuit has a parallel resonant LC filter that is configured and disposed to reduce the size and power loss of the resonant LC filter. The parallel resonant LC filter is configured to have its resonant frequency two times a frequency of the input current, increase an impedance of the resonant LC filter at the output current ripple frequency, reduce a size requirement of the parallel resonant LC filter, and minimize an output AC ripple current and output capacitance. The LED driver also has an external current control loop having a dimming interface.

In at least another embodiment, a light emitting diode (LED) driver has a wide input voltage range between about 100V and about 528V and is configured for powering an LED load at a substantially constant current. The LED driver has a single stage buck-boost type power factor correction (PFC) circuit, having a PFC controller. The buck-boost PFC circuit is configured to: (i) draw an alternating current (AC) input current having a sinusoid waveform as line voltage; (ii) sense a rectified input voltage from a full-wave rectifier at the PFC controller and output a direct current (DC) voltage and a DC current; (iii) achieve a low total harmonic distortion (THD) of at most 10%; (iv) achieve high power factor (PF) of greater than 0.95; (v) achieve a low line frequency ripple on the output DC current of at most 10%; and (vi) control a maximum switching frequency, mitigate electromagnetic interference, and improve efficiency.

BRIEF DESCRIPTION OF THE DRAWINGS

The foregoing and other features of this disclosure will become more fully apparent from the following description and appended claims, taken in conjunction with the accompanying drawings and examples. Understanding that these drawings depict only several embodiments in accordance with the disclosure and are therefore, not to be considered limiting of its scope, the disclosure will be described with additional specificity and detail through use of the accompanying drawings.

The following figures, which are idealized, are not to scale and are intended to be merely illustrative of aspects of the present disclosure and non-limiting. In the drawings, like elements may be depicted by like reference numerals. The drawings are briefly described as follows.

DETAILED DESCRIPTION OF THE INVENTION

The presently disclosed luminaire and driver having a single or sole power input terminal and wide input voltage range between about 100V and about 528V may be sold to various types of customers that have different types of input voltage and avoids a selection of a proper power input terminal for installation.

Luminaires, or light fixtures, are designed to provide specific types of lighting for various applications. A luminaire is a device that houses and distributes light from a source, such as an LED. They come in various designs tailored for specific applications. Examples of types of luminaires include ceiling mounted, wall mounted, free standing, pendant and hanging, track and rail, outdoor, specialty, and industrial and commercial luminaires.

Figure 1A:
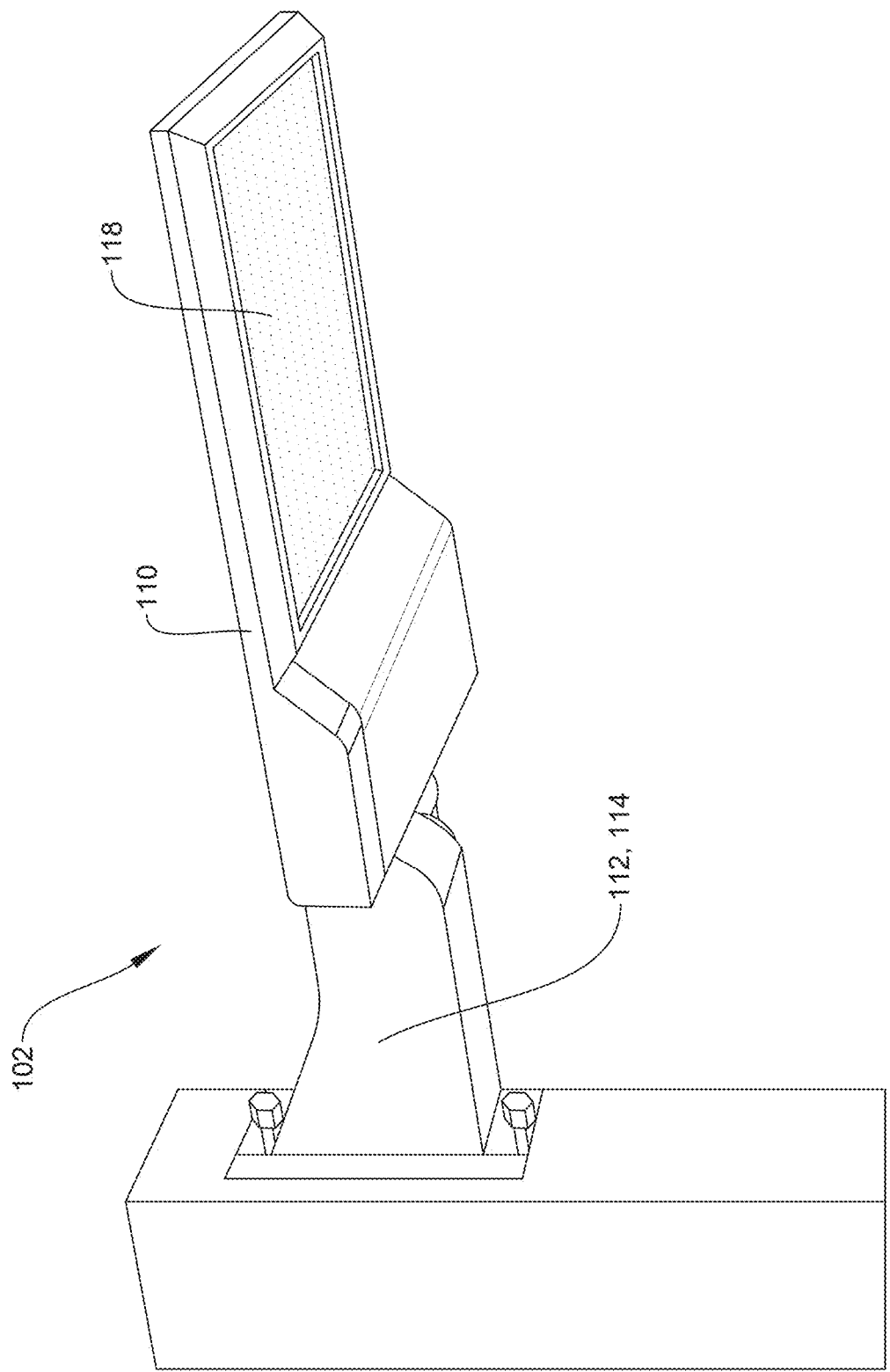
FIGS. 1A-1C show examples of the presently disclosed luminaire having at least one LED in electrical connection with a driver having a single power input terminal and wide input voltage range.

FIG. 1A shows an example outdoor luminaire of the present disclosure. Outdoor luminaire 102 is designed for exterior use which may offer safety, security, and decorative lighting. For example, Luminaire 102 may be a cobra head light. Luminaire 102 houses a driver 110 and has at least one LED 118 in electrical connection with driver 110. Driver 110 has a single power input terminal 112 and wide input voltage range between about 100V and 528V or between about 120V and about 480V. Driver 110 is configured to supply power to the at least one LED 118 at a substantially constant current or at a substantially constant voltage. Line 114 is configured and disposed to ground luminaire 102.

Figure 1B:
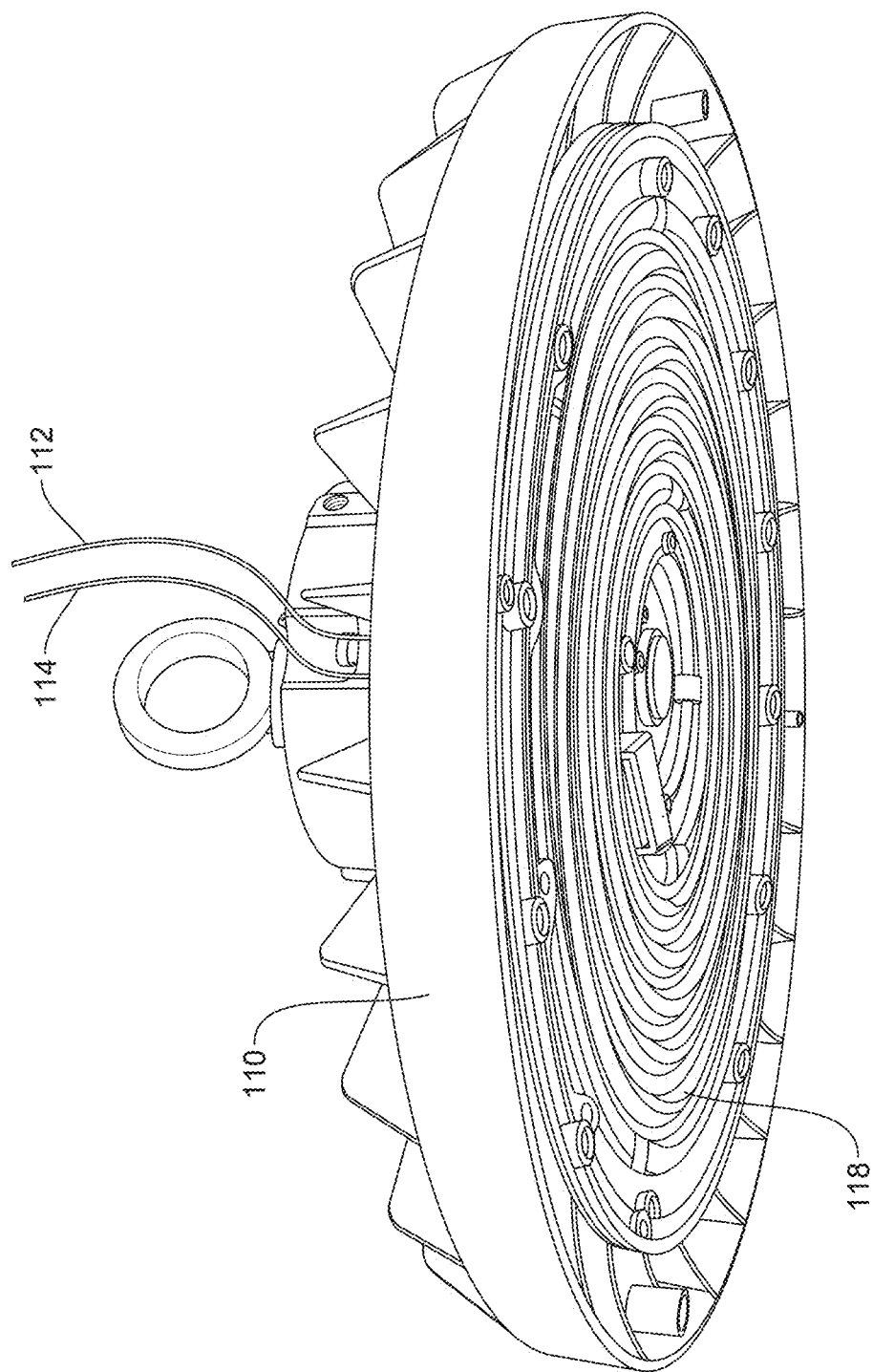
Figure 1C:
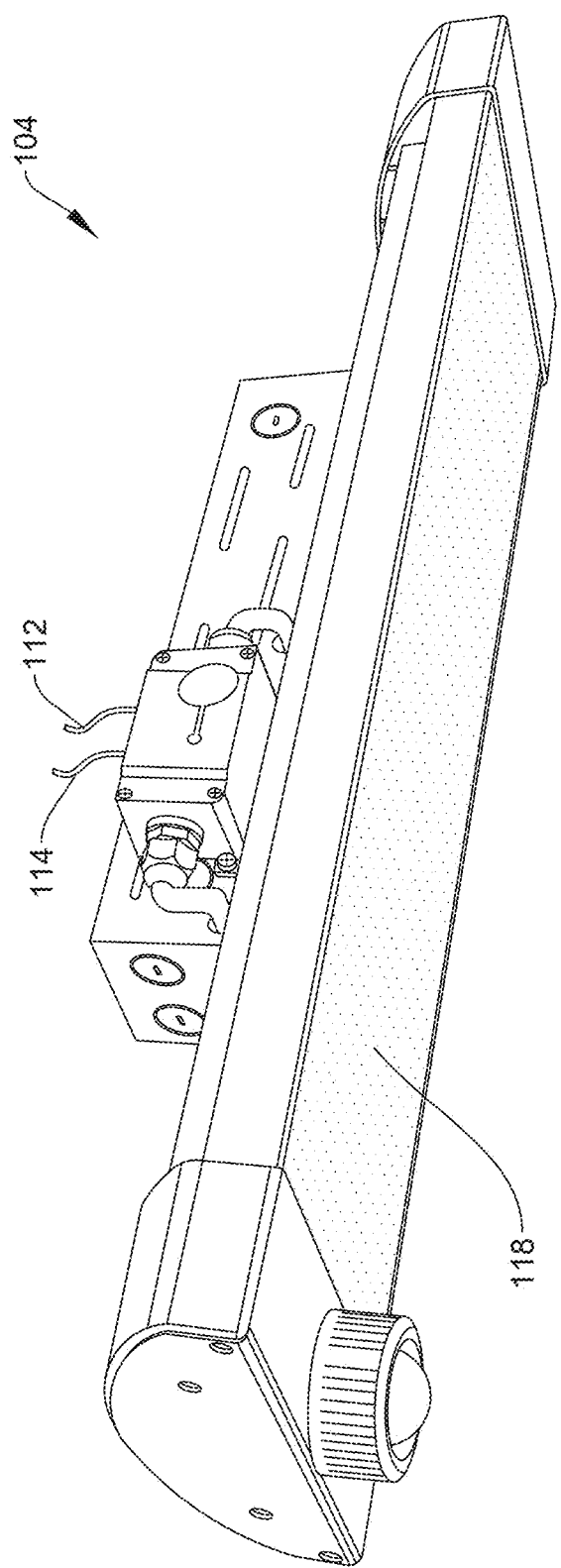

FIGS. 1B and 1C show examples of indoor luminaires of the present disclosure. Indoor luminaires 103 and 104 may be designed for industrial or commercial uses. For example, luminaires 102 and 103 may be configured for high-performance, durability, and efficiency in non-residential settings.

Luminaire 102, shown in FIG. 1B, may be configured to be disposed for high bay or low bay lighting applications. Luminaire 102 houses a driver 110 and has at least one LED 118 in electrical connection with driver 110. Driver 110 has a single power input terminal 112 and wide input voltage range between about 100V and about 528V or between about 120V and about 480V. Driver 110 is configured to supply power to the at least one LED 118 at a substantially constant current or at a substantially constant voltage. Line 114 is configured and disposed to ground luminaire 102.

Luminaire 103 may be configured to be disposed for high bay, low bay, or troffer lighting applications. Luminaire 103 houses a driver 110 and has at least one LED 118 in electrical connection with driver 110. Driver 110 has a single power input terminal 112 and wide input voltage range between about 100V and about 528V or between about 120V and about 480V. Driver 110 is configured to supply power to the at least one LED 118 at a substantially constant current or at a substantially constant voltage. Line 114 is configured and disposed to ground luminaire 103.

Figure 2:
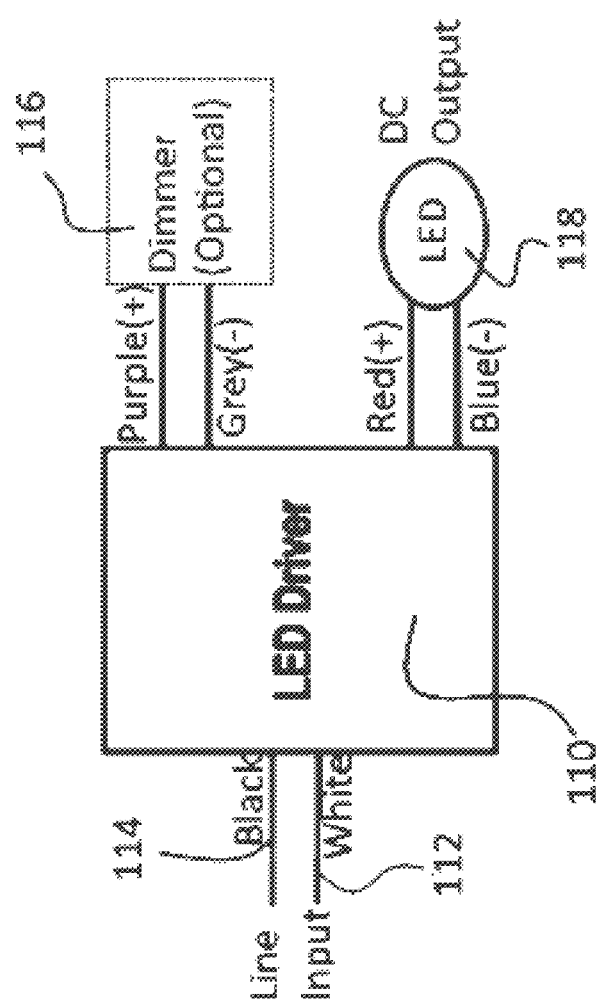
FIG. 2 shows an example driver that may be a component of the presently disclosed luminaire.

FIG. 2 shows an example driver 110 that may be a component of the presently disclosed luminaire. LED driver 110 is in electrical connection with at least one LED 118. LED driver 110 has a single, or sole, power input terminal. Line 114 is configured and disposed to ground driver 110. LED driver 110 has wide input voltage range between about 100V and 528V, or between about 120V and about 480V. LED driver 110 is configured to supply power to at least one LED 118 at a substantially constant current or at a substantially constant voltage.

It may be desirable to have an LED driver that has a wide range voltage input range between about 100V and about 528V so that the fixture can be sold to various types of customers that have different types of input voltage available. It may also be desirable to have an LED driver that has a single or sole power input terminal to avoid a selection of a proper input.

FIGS. 3-15 illustrate an example of the presently disclosed LED driver having a single or sole power input terminal and wide input voltage range between about 100V and about 528V. The presently disclosed luminaire may have the driver as presently illustrated or may have a differently configured LED driver that has a wide range voltage input range between about 100V and about 528V to supply power to the at least one LED 118 at a substantially constant current or at a substantially constant voltage.

In at least one embodiment, the driver may have a single stage buck boost type led driver with wide input voltage range. In at least one other embodiment, a light emitting diode (LED) driver is configured for powering LED(s) and having a wide input voltage range between about 100V and about 528V, high power factor, low total harmonic distortion (THD), and low output current ripple load. The LED driver may have a single stage buck-boost type converter with output current regulation, an output current regulation circuit, a ripple control circuit having a transient voltage suppressor (TVS) and a parallel resonant LC filter, a power factor correction (PFC) control circuit having a digital compensation block, a PFC controller, and a gate drive IC.

Most of the LED drivers have a two-stage solution, a first stage Power Factor Correction (PFC) and a second stage DC-DC converter for current regulation. The main advantage of this two-stage solution is that the output LED current ripple may be controlled at a low magnitude. However, the two stages may decrease the efficiency. Also, because of the two-stages there must be at least two main active switching devices, i.e., MOSFET, to control the power flow. Semiconductor switches are very susceptible to be damaged by thermal, over current and over voltage. The more switches a driver uses, the less reliable the driver will be. Therefore, minimizing the number of switches is advantageous in improving the driver reliability or life span.

Most of the LED drivers have a two-stage solution, a first stage Power Factor Correction (PFC) and a second stage DC-DC converter for current regulation. The main advantage of this two-stage solution is that the output LED current ripple may be controlled at a low magnitude. However, the two stages may decrease the efficiency. Also, because of the two-stages there must be at least two main active switching devices, i.e., MOSFET, to control the power flow. Semiconductor switches are very susceptible to be damaged by thermal, over current and over voltage. The more switches a driver uses, the less reliable the driver will be. Therefore, minimizing the number of switches is advantageous in improving the driver reliability or life span.

To minimize the semiconductor switch number and improve the reliability of the driver, single stage PFC with output current regulation may be preferred. PFC topologies like buck-boost, isolated flyback, non-isolated flyback, Sepic or Cuk, may provide desired functionality.

Figure 3:
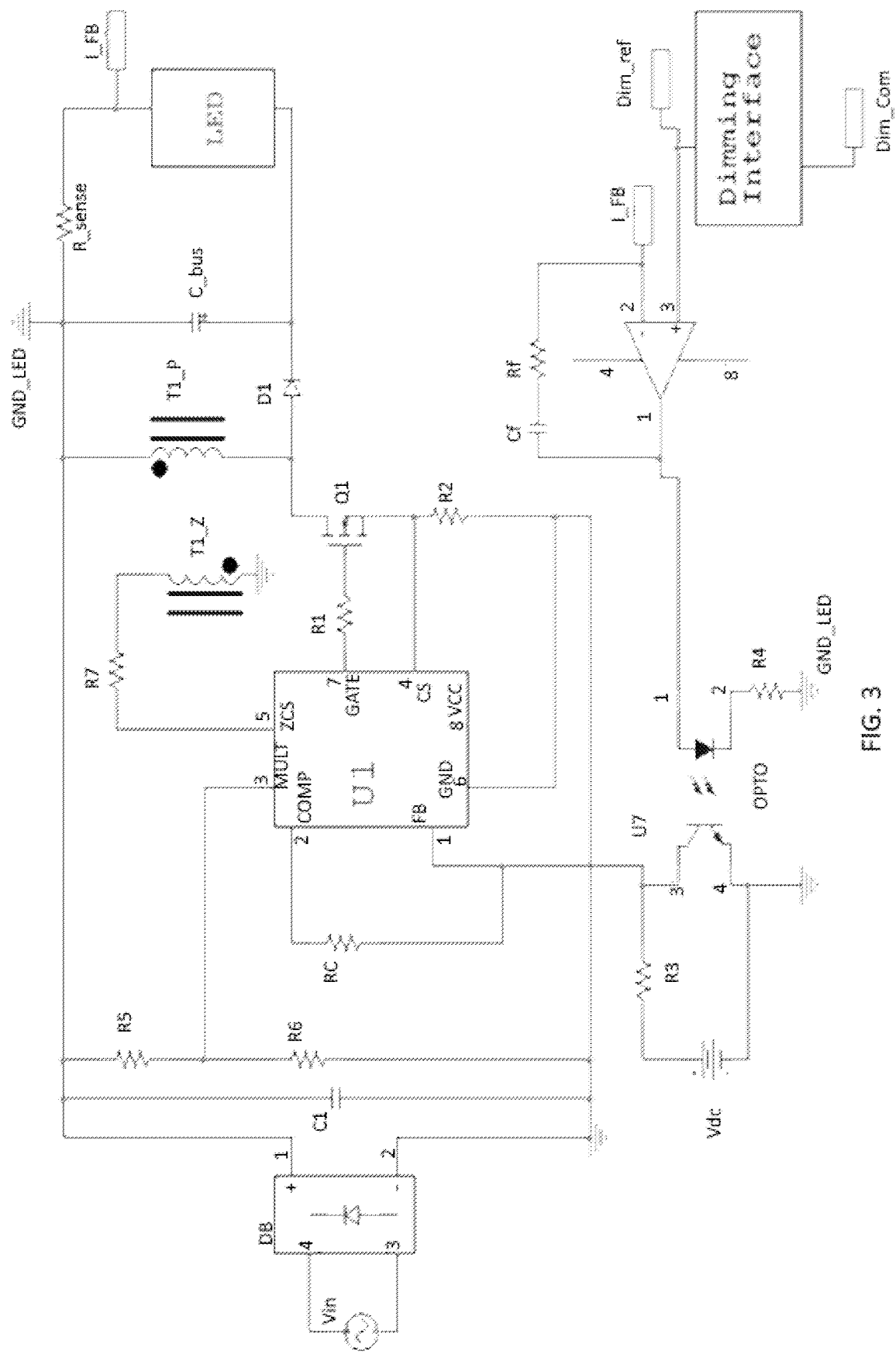
FIG. 3 shows an illustrative view of a Buck-boost type PFC in critical conduction mode.
Figure 4:
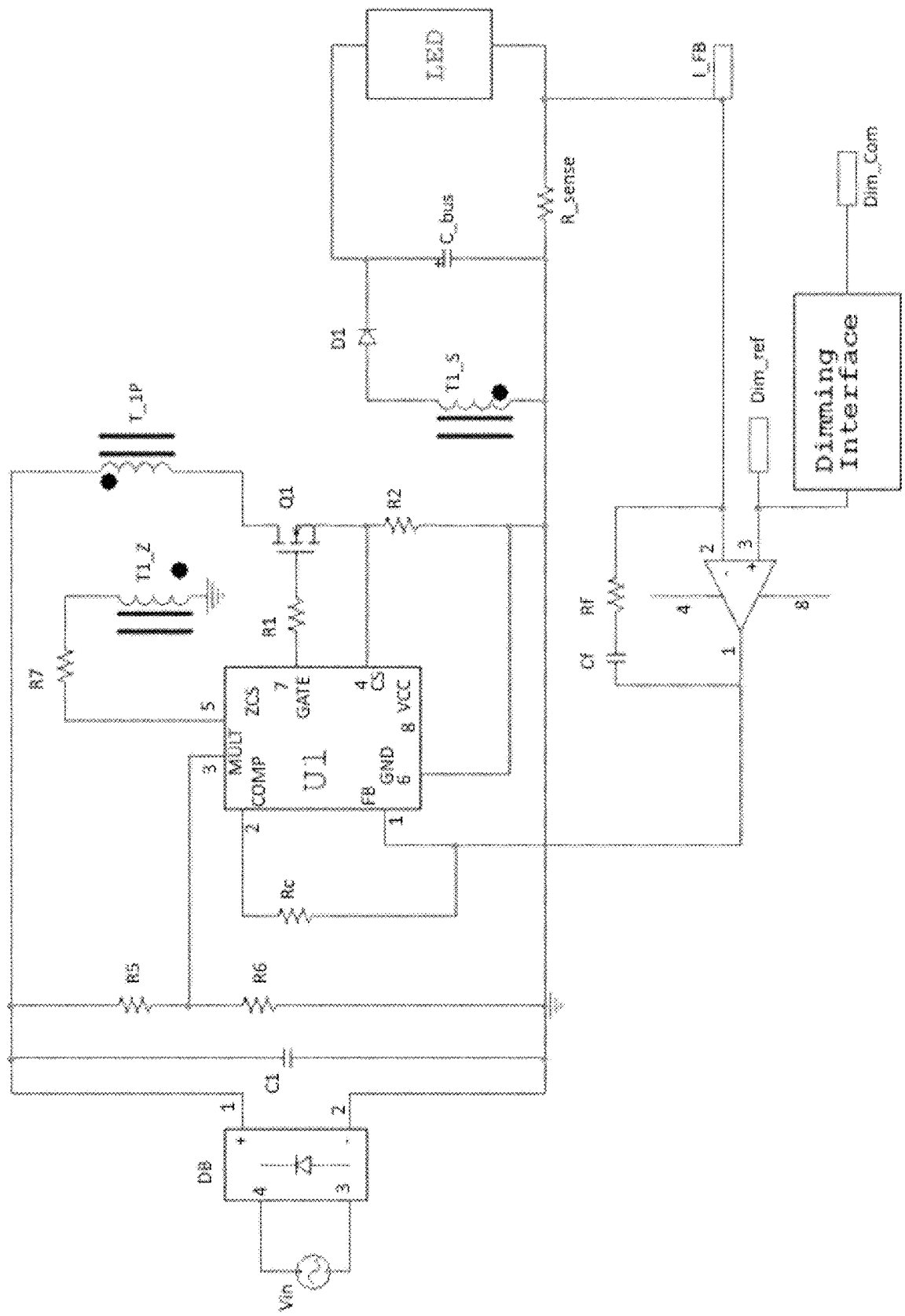
FIG. 4 shows a non-isolated flyback type PFC in critical conduction mode.

Among those, Buck boost and non-isolated flyback may provide optimum functionality since they require the least number of components to achieve high power factor and output current regulation. Traditional critical mode PFC controller with buck-boost type converter is shown in FIG. 3 and FIG. 4, showing buck-boost type PFC in critical conduction mode and non-isolated flyback type PFC in critical conduction mode, respectively.

Figure 5:
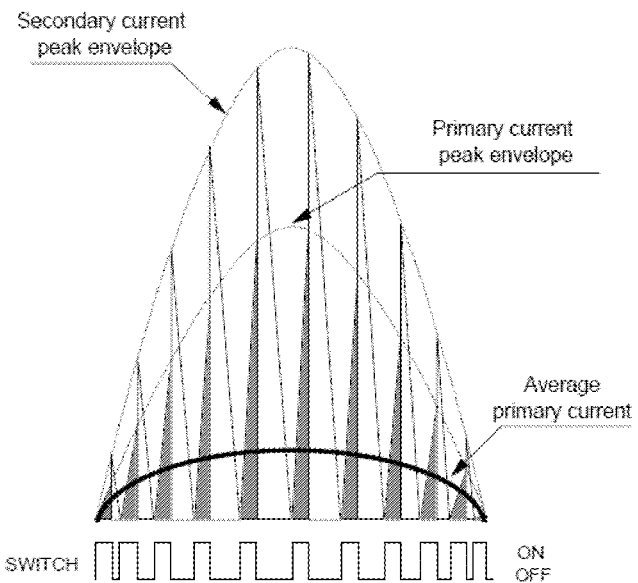
FIG. 5 shows a transformer (T1) primary, secondary current, and average primary current.

FIG. 5 shows transformer (T1) primary, secondary current and average primary current. The control of this type of critical conduction mode PFC is well known. Commercial PFC control IC, like ST microelectronics L6561, may be used to achieve power factor correction and output current regulation. PFC controller works in such a way to force the peak current of the T1 to follow a reference that is in phase with the input voltage, shown in FIG. 5. As a result, the average current of the T1 will be in phase with line voltage too and good power factor is achieved.

Figure 6:
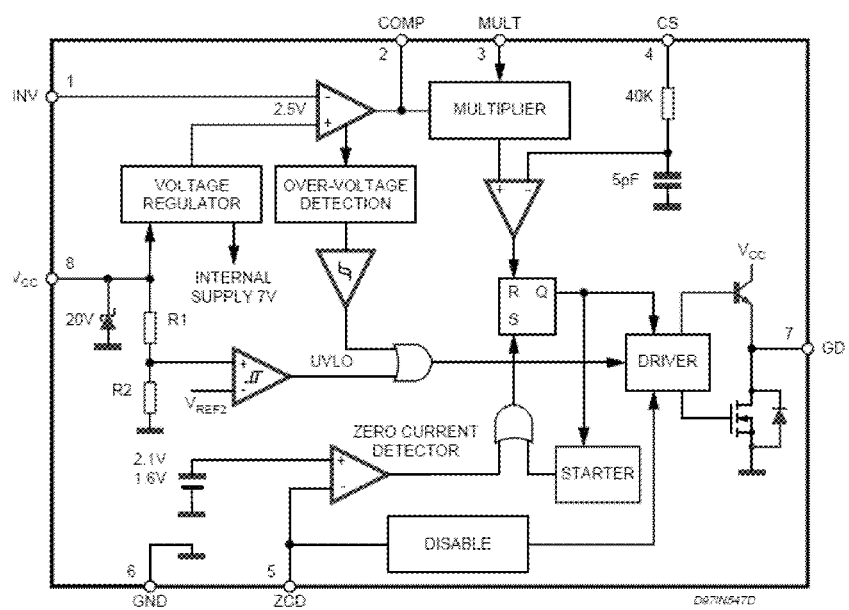
FIG. 6 shows a control block of PFC controller U1.
Figure 7:
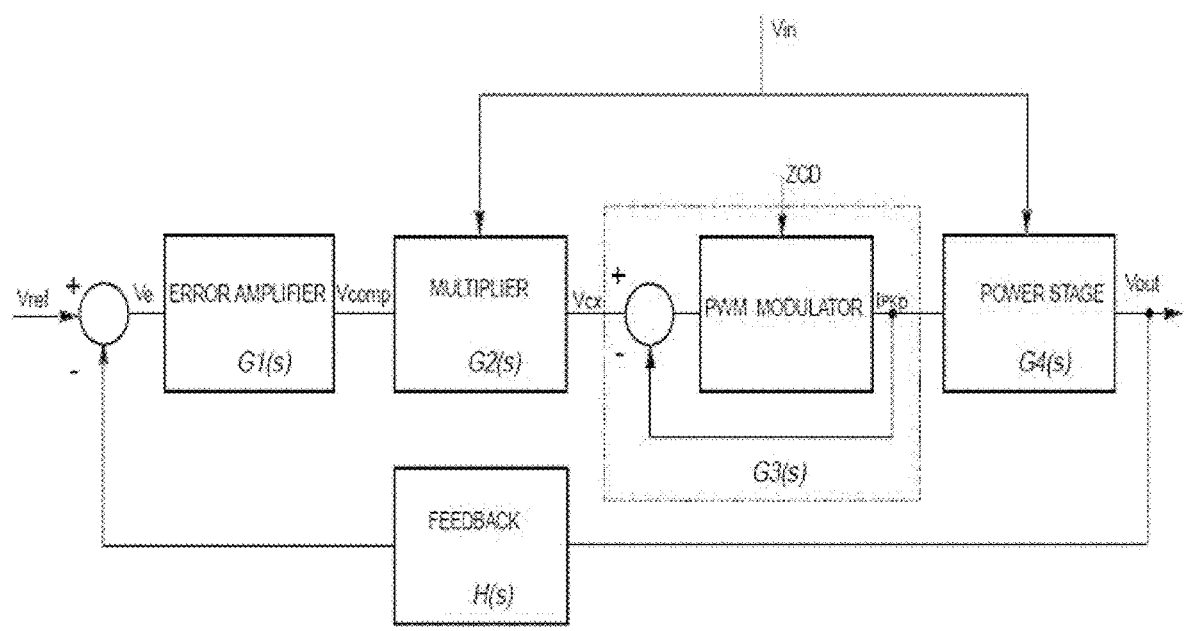
FIG. 7 shows a loop transfer function block.

FIG. 6 shows control block of PFC controller U1 and FIG. 7 shows a loop transfer function block. The control block that PFC controller U1 uses to force the inductor current peak to follow the reference voltage is shown in FIG. 6 and the loop transfer function block is shown in FIG. 7.

Figure 8:
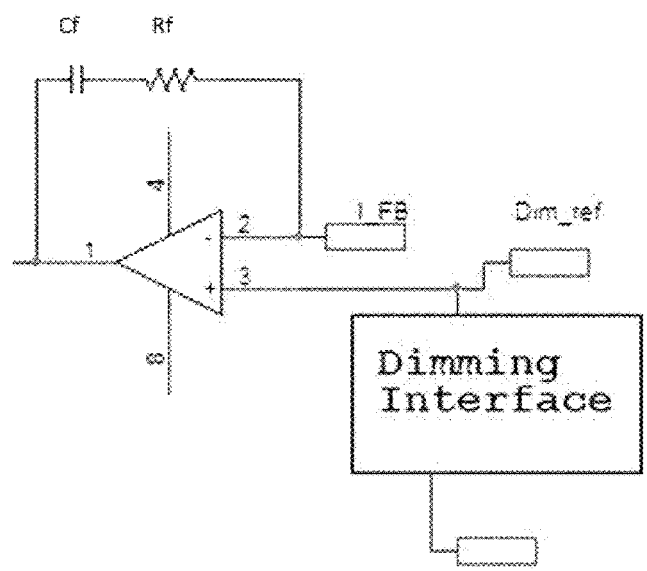
FIG. 8 shows an external current control loop.

The external control loop shown in FIG. 8 forces LED current to be equal to the dimming reference (dim_ref). The error of the current control loop is then fed back to pin1 of U1 (COMP) for internal control. OPTO is used to isolate the control loop to the U1 when output of LED is not on the same ground as U1.

R5 and R6 are multiplier divider that feeds back the input voltage information. The ratio of the multiplier is defined as Km.

$$Km = \frac{R_6}{R_5 + R_6} \quad (1)$$

T1_Z is a winding that helps detect zero current for switch turning on.

R2 is the switch current sensing resistor that feeds back the T1 current to U1.

Rc is the U1 proportional feedback resistor for U1.

In steady state, the reference current (for primary current peak envelope) follows the input voltage by design as mentioned above:

$$V_{cs_{ref}}(\theta) = V_{comp} \times V_{in_{peak}} \times \sin(\theta) \times K_m \times K_G \quad (2)$$

$K_G$ is the U1 internal multiplier gain constant.

Primary inductor T1 peak current follows Vcs_ref. Simplifying (2) we have:

$$I_{peak_p}(\theta) = \frac{V_{comp} \times V_{in_{peak}} \times \sin(\theta) \times K_m \times K_G}{R_2} = I_{PKP} \cdot \sin(\theta) \quad (3)$$

$$I_{PKP} = \frac{V_{comp} \times V_{in_{peak}} \times K_m \times K_G}{R_2} \quad (4)$$

Based on the operating of the switching and control, we can average the input peak current (3) and have the input line current:

$$I_{in}(\theta) = \frac{1}{2} \cdot I_{PKP} \cdot \frac{\sin(\theta)}{1 + K_v \cdot \sin(\theta)} \quad (5)$$

Kv is a constant defined by:

$$K_v = \frac{V_{in_{peak}}}{N_{ps} \cdot V_{LED}} \quad (6)$$

Figure 9:
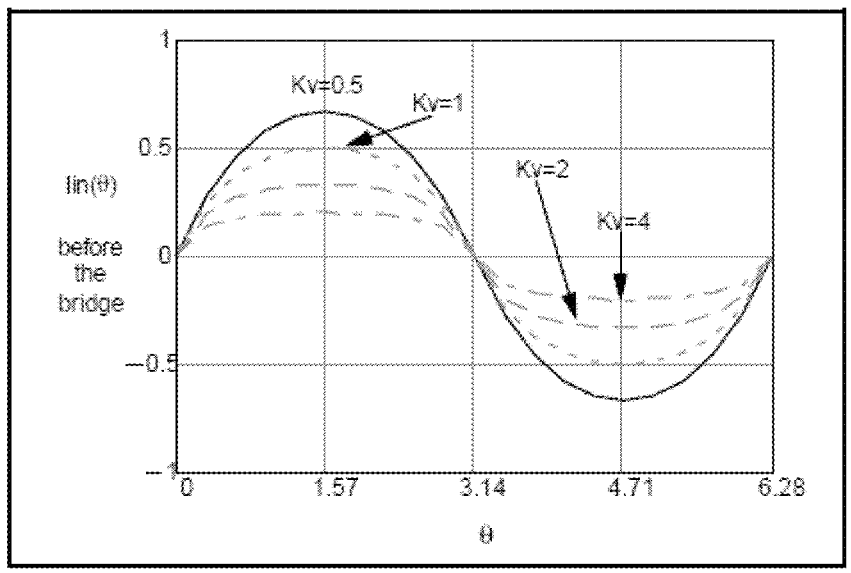
FIG. 9 shows line current of buck-boost type PFC.

The input line waveform can be plotted as in FIG. 9, showing line current of buck-boost type PFC. As shown, due to the denominator of (5) line current is not an ideal sinusoid wave as input voltage, which will introduce a big current distortion factor (THD) and reduce the power factor even the input current is in phase with the input voltage (according to equation 7).

$$PF = \frac{1}{\sqrt{1 + (Thd)^2}} \cdot \cos(\beta) \quad (7)$$

The switching frequency can also be defined as:

$$f_{sw}(\theta) = \frac{V_{in_{peak}}}{L_{T1} \cdot I_{PKP}} \cdot \frac{1}{1 + K_v \cdot \sin(\theta)} \quad (8)$$

From (8) we can see that for the same input voltage switching frequency reaches minimum at the peak of the line when $\sin(\theta)=1$ and reaches maximum at zero crossover when $\sin(\theta)=0$.

$$f_{sw\_min} = \frac{V_{in_{peak}}}{L_{T1} \cdot I_{PKP}} \cdot \frac{1}{1 + K_v} \quad (9)$$

As shown in (9) when input line voltage changes a lot, the minimum switching frequency can have a very big swing. For example, for an output 230V, current 1.05A, LT1=0.3mH buck boost type PFC, the frequency range is given in table I:

TABLE I an example of frequency swing between 120 V-480 V input

| Vin (volt) | Switching frequency (kHz) |
|---|---|
| 120 | 35 |
| 277 | 80 |
| 347 | 95 |
| 480 | 116 |

As shown, the frequency at 480V is 3 times more than that of 120V. High switching frequency not only hurts the efficiency, but also hurts the EMI. These problems (Low power factor, THD, high operating frequency at high line) are inherent drawbacks of buck boost type PFC. Other than these 3 drawbacks there is 1 more common problem for single stage PFC LED driver for wide range input voltage. These drawbacks are listed below:

1. Operating Frequency range is too wide.
2. Due to non-continuous primary side current, THD and Power Factor will be not ideal at high line.
3. High ripple on output LED current at line frequency (120 Hz or 100 Hz).

In this disclosure, these problems are addressed to achieve a high-power factor, low THD, highly efficient and low output ripple LED driver.

Proposed solution for a single stage LED driver with wide input voltage:

The following description will mitigate the drawbacks one by one:

A) Solve THD and Power factor drawbacks.

Substitute equation (4) into (5) and rearrange it, we have the input line current:

$$I_{in}(\theta) = \frac{1}{2} \cdot \frac{V_{comp} \times K_G}{R_2} \cdot \frac{V_{in_{peak}} \times K_m \times \sin(\theta)}{1 + K_v \cdot \sin(\theta)} \quad (10)$$

$V_{comp}$ in equation (10) is the inner control loop output of U1. It changes with the output power. When output power is high and line voltage is low, it increases. When output power is low and line voltage is high it decreases.

In equation (10) $V_{in_{peak}} \times K_m \times \sin(\theta)$ is the Mult_in signal that follows the input line voltage waveform. Because of the denominator $1+K_v \cdot \sin(\theta)$ the line current $l_{in}(\theta)$ is not a sinusoid waveform as input line voltage.

If we compensate the Mult_in signal and force it to be something like:

$$V_{mult_{out}} = G_T \times \sin(\theta) \times (1 + K_v \cdot \sin(\theta)) \quad (11)$$

Substitute (11) into (10), We will have a perfect input line waveform shown in equation (12):

$$I_{in}(\theta) = \frac{1}{2} \cdot \frac{V_{comp} \times K_G}{R_2} \cdot \frac{G_T \times \sin(\theta) \times (1 + K_v \cdot \sin(\theta))}{1 + K_v \cdot \sin(\theta)} = \frac{1}{2} \cdot \frac{V_{comp} \times K_G}{R_2} \cdot G_T \cdot \sin(\theta) \quad (12)$$

Rearrange equation (11) we have:

$$V_{mult_{out}} = G_T \times \sin(\theta) + G_T \cdot K_v \cdot \sin(\theta)^2 \quad (13)$$

We can see our desired Vmult_out is a sum of normal sinusoid and a square of a sinusoid signal. Since we already have a sinusoid signal from Mult_in we can multiply itself in the uC to create the second item in (11).

Figure 10:
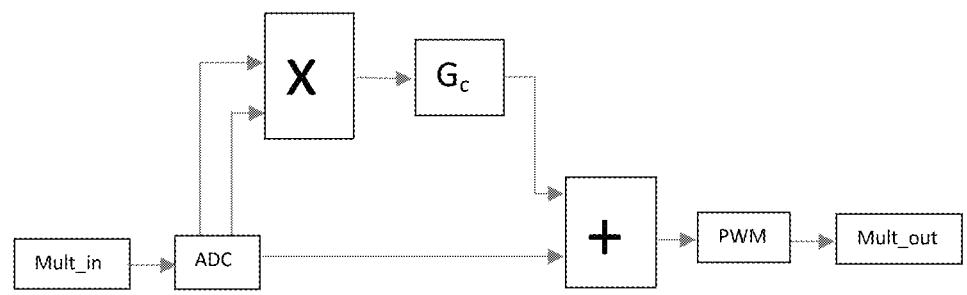
FIG. 10 shows the logic to create desired Mult_out.

The logic to create our desired Mult_out is shown in FIG. 10. If we set the gain Gc in FIG. 10 as, $$G_c = \frac{K_v}{V_{in_{peak}} \cdot K_m} \quad (14)$$

We can calculate the sum output in FIG. 10 as:

$$\text{Sum} = V_{in_{peak}} \times K_m \times \sin(\theta) + (V_{in_{peak}} \times K_m \times \sin(\theta))^2 \cdot G_c \quad (15)$$

Simplify (15) we have:

$$\text{Sum} = V_{in_{peak}} \cdot K_m \times \sin(\theta) \cdot (1 + K_v \cdot \sin(\theta)) \quad (16)$$

Comparing (16) with (11), it is shown that we have successfully created a multiplier signal that we desired to force the line current in sinusoid and in phase with the line voltage to obtain a good power factor.

Since we already have the sinusoid input at the uC, it is easy for uC to do Analog to Digital conversion (ADC) and multiply them in the core with the gain Gc. Then the summing the result with the original Mult_in we have (16).

Figure 11:
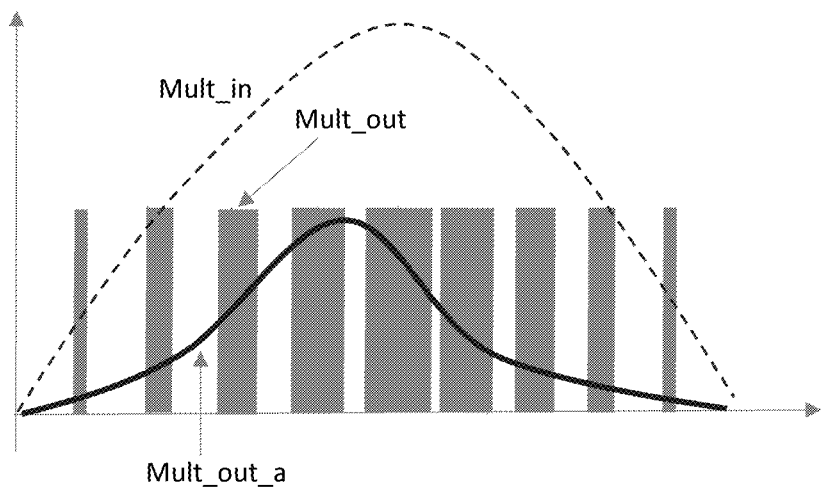
FIG. 11 shows PWM generation for Mult_out.

FIG. 11 shows the PWM generation for Mult_out. The result of (16) then can be fed to a PWM generator in uC to create a fix frequency PWM waveform (shown in FIG. 11) to recreate the Mult_out waveform.

The duty ratio of the PWM can be defined as:

$$PWM_{Duty} = \frac{SUM}{V_{ref_{PWM}}} \quad (17)$$

$V_{ref\_PWM}$ is the power supply voltage reference for uC.

A filter consisting of R8 and C2 will filter out the high frequency component in PWM Mult_out and average it into a low frequency waveform Mult_out_avg that can be used for PFC controller U1. As shown, the final MULT signal after compensation for U1 is not a sinusoid signal, the distortion in the signal is used to cancel the denominator effect in (10).

Till now we have a good sinusoid input line current waveform. THD and power factor will be dramatically improved as a result.

B) Solve Wide Frequency Range Drawback.

The second problem we must solve for this wide range input single stage LED driver is the wide operating frequency range. We must limit the maximum frequency reduce the switching loss and electromagnetic interference (EMI).

To clamp the maximum frequency, we can use uC to sense the switching ON edge and limit the total period of switching cycle.

Figure 12:
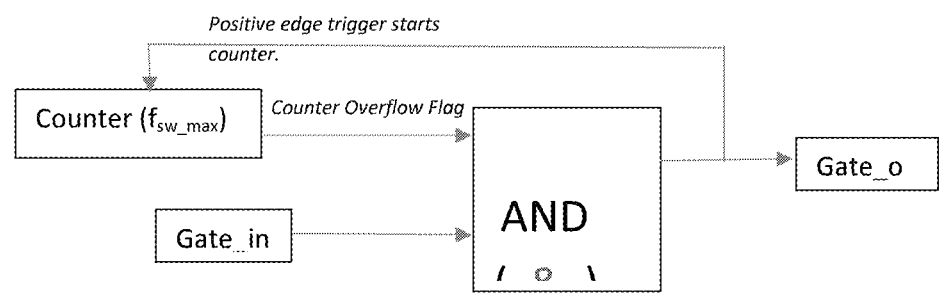
FIG. 12 shows maximum switching frequency limiting.

FIG. 12 shows maximum switching frequency limiting. As shown in FIG. 12, uC will utilize a counter that has a preset period $T_{max} = 1/f_{sw\_max}$. The counter will be triggered ON when uC senses positive edge of Gate_out.

At initial turn on of the power, uC will force the counter overflow flag=1 to let the first gate ON signal from U1, Gate_in. From that time on, the Counter will be triggered ON by the positive edge of Gate_out.

If Gate_in signal turns high before counter finishes (overflow flag=1), the Gate_out will be forced to be low according to the AND logic, which means Gate_in frequency is higher than the maximum frequency we set. The uC waits for the counter finishes the counting period to allow Gate_out to be high.

If the Gate_in turns high after the counter period finishes, Gate_out will be high.

Anytime if Gate_in is LOW (Turn-off signal), the Gate_out will be low by AND logic.

It is very simple logic and as a result the switching frequency will be effectively limited to whatever we desire.

A dedicated gate drive IC can be used to repeat the Gate_out signal to drive main switch Q1.

C) Solve LED Output Current Ripple Drawback at 100 Hz or 120 Hz.

The last problem we need to solve is the output current ripple at 100 Hz (if line frequency is 50 Hz) or 120 Hz (if line frequency is 60 Hz).

We chose to use a parallel resonant type of LC filter (shown in FIG. 13) to suppress the current ripple. The resonant filter can effectively reduce the size of the magnetic size and improve efficiency.

Figure 13:
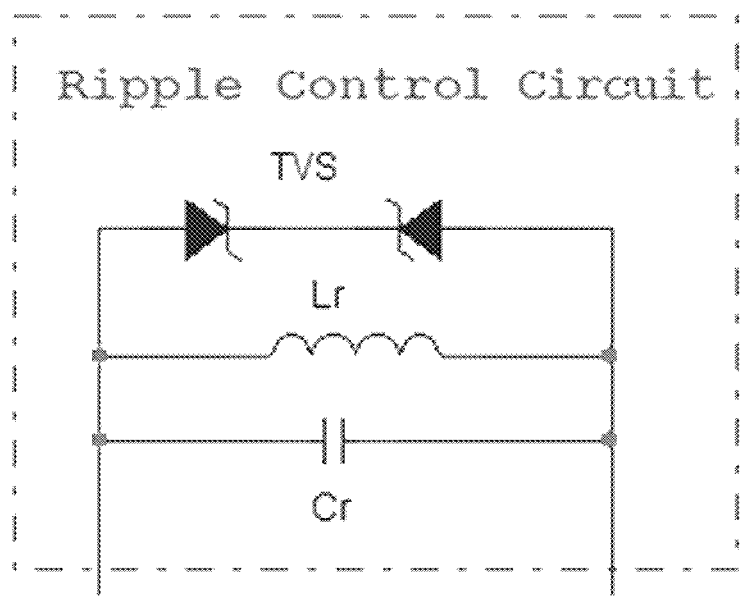
FIG. 13 shows parallel resonant LC filter for output ripple control of the present disclosure.

FIG. 13 shows parallel resonant LC filter for output ripple control. As shown in FIG. 13, Lr and Cr are the main components of the parallel resonant circuit. The purpose of choosing a parallel resonant circuit is to increase the impedance of the filter at ripple frequency and reduce the size of the inductor Lr.

The resonant frequency of the circuit should be set as:

$$f_{res} = \frac{1}{2 \cdot \pi \cdot \sqrt{L_r \cdot C_r}} \quad (18)$$

A TVS (transient voltage suppressor) is connected across the tank to limit the transient voltage when output is open.

D) Hardware and Software Implementation.

Figure 14:
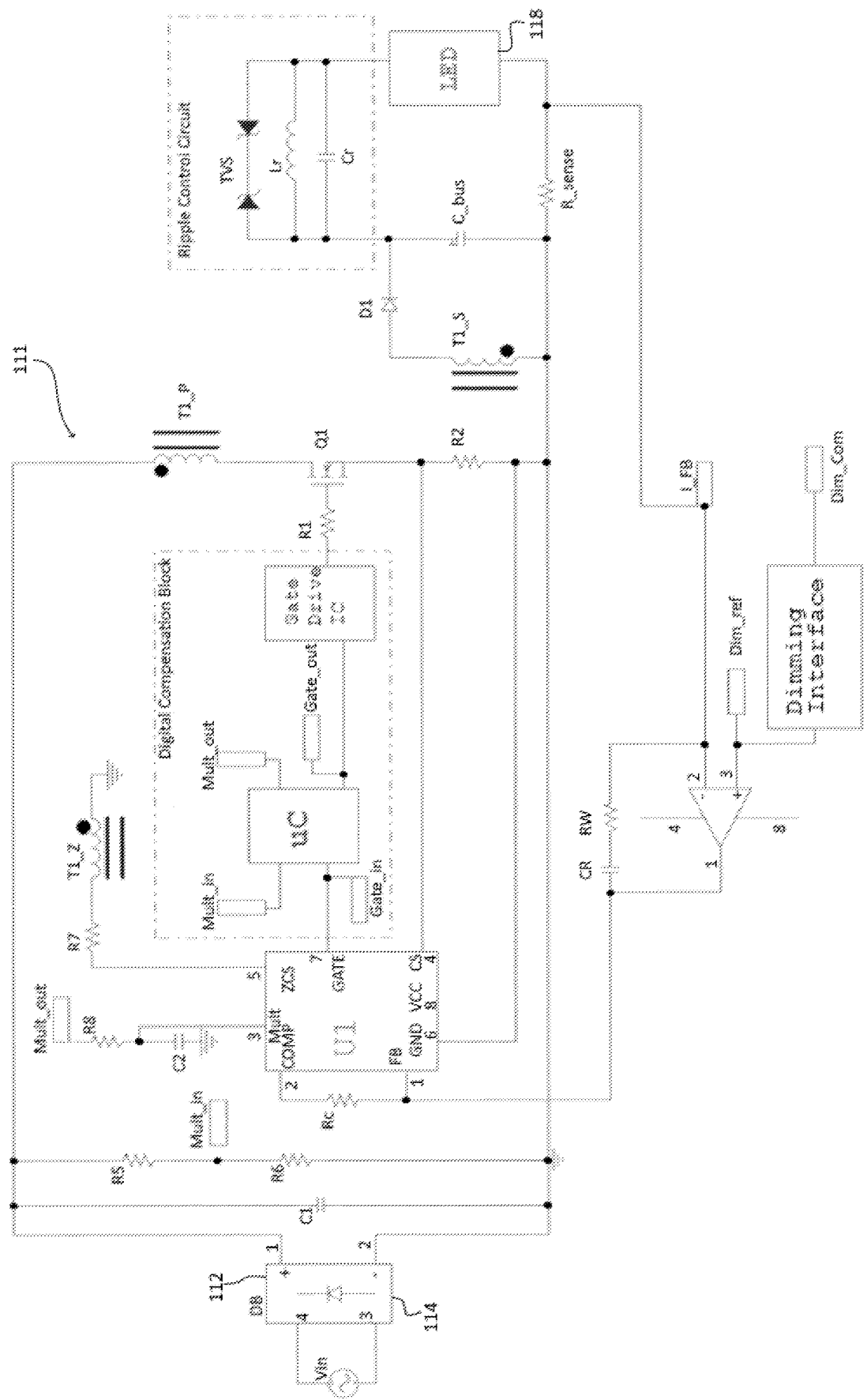
FIG. 14 schematically shows hardware configuration of the driver of the present disclosure.
Figure 15:
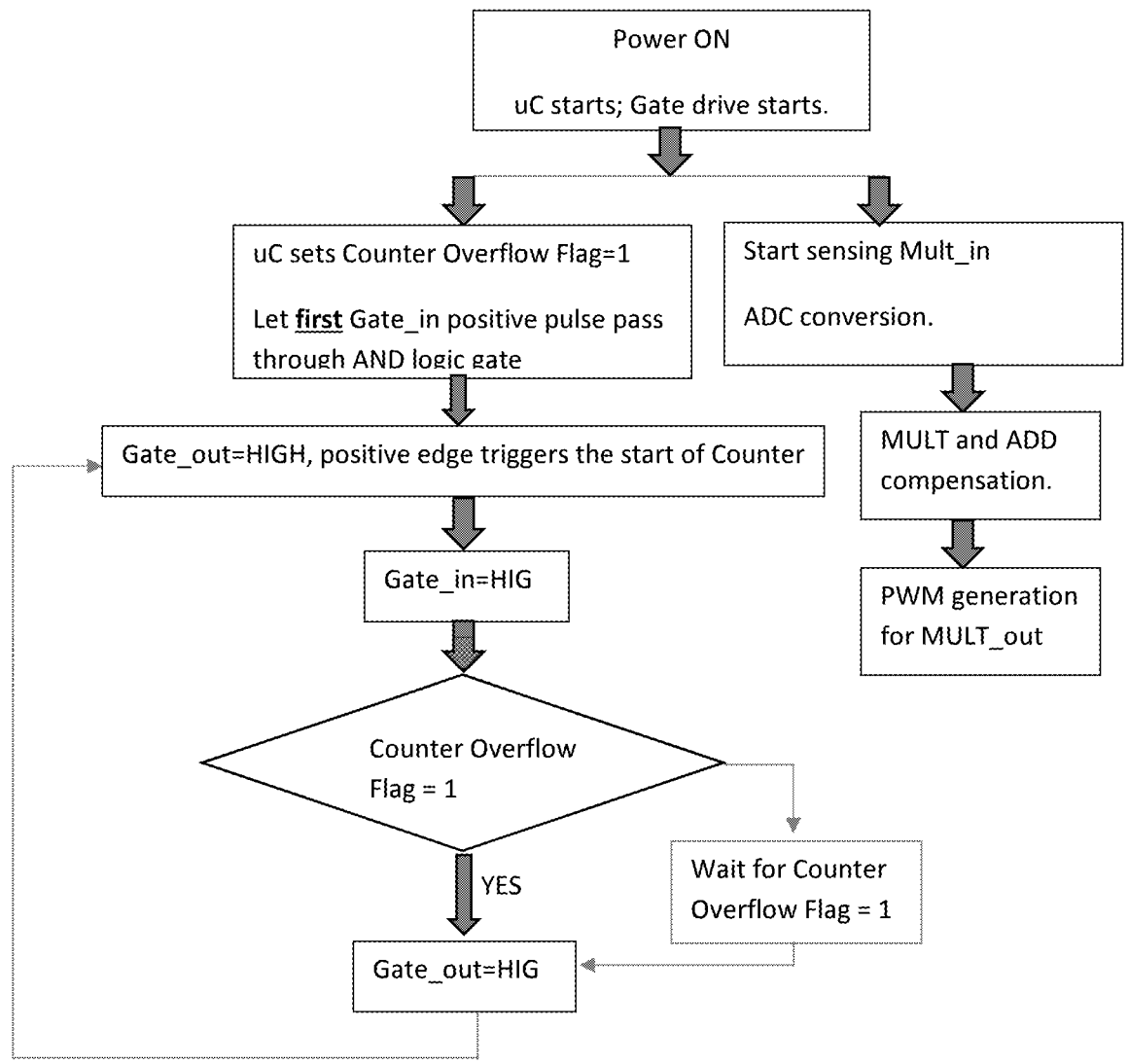
FIG. 15 shows software implementation of the driver of the present disclosure.

The hardware implementation of the presently disclosed example driver is shown in FIG. 14 and the final software implementation is shown in FIG. 15.

FIG. 14 shows another example driver 111 that may be a component of the presently disclosed luminaire. The presently disclosed luminaire may have the driver as presently illustrated or may have a differently configured LED driver 110 that has a wide range voltage input range between about 100V and about 528V to supply power to the at least one LED 118 at a substantially constant current or at a substantially constant voltage.

In an exemplary illustration, the luminaire of the present disclosure may have a driver as disclosed in U.S. patent application Ser. No. 18/734,112, titled "A SINGLE STAGE BUCK BOOST TYPE LED DRIVER", filed Jun. 5, 2025, herein incorporated by reference in its entirety.

For example, an embodiment of the presently disclosed luminaire may have an LED driver 111 configured for powering an LED having a wide input voltage range between about 100V and about 528V, high power factor, low total harmonic distortion (THD), and low output current ripple load. The LED driver may have a single stage buck-boost type converter with output current regulation, an output current regulation circuit configured to control an output current to match a control signal, DIM_command, a ripple control circuit having a transient voltage suppressor (TVS) and a parallel resonant LC filter and being configured and disposed to receive DC current output by the single stage buck-boost type converter, take advantage of the high impedance at resonance, reduce the size of the resonant LC filter, improve efficiency, and minimize the output current ripple content and output capacitance, a power factor correction (PFC) control circuit having a digital compensation block, a PFC controller, and a gate drive IC, the PFC control circuit is configured and disposed to: (i) force an input AC current to track an input voltage waveform and achieve high power factor (PF) and a low THD; (ii) sense a rectified input voltage from a full-wave rectifier, MULT_in, and process it in a digital core of an uC, and output a new compensated MULT signal, MULT_out, for the PFC controller; and (iii) limit a maximum frequency of a gate drive signal, Gate_out, to reduce switching loss, improve efficiency, and improve electromagnetic interference. A passive voltage multiplier circuit may be disposed between the full-wave rectifier and an input of the PFC controller and may be configured to sense the input voltage waveform. The input AC current may have the same waveform as input voltage, achieving the high power factor and the low THD.

FIG. 15 shows an example software logic of a driver of that may be a component of the presently disclosed luminaire.

One feature or aspect of an embodiment is believed at the time of the filing of this patent application to possibly reside broadly in a luminaire comprising, a driver and at least one LED in electrical connection with the driver. The driver has a single, or sole, power input terminal and wide input voltage range. The wide input voltage range of the driver is between about 100V and 528V. The driver is configured to supply power to the at least one LED at a substantially constant current or at a substantially constant voltage.

Another feature or aspect of an embodiment is believed at the time of the filing of this patent application to possibly reside broadly in a luminaire wherein the wide input voltage range of the driver is between about 120V and about 480V.

Yet another feature or aspect of an embodiment is believed at the time of the filing of this patent application to possibly reside broadly in a luminaire wherein the driver is configured to supply the power to the at least one LED at the substantially constant current.

Still another feature or aspect of an embodiment is believed at the time of the filing of this patent application to possibly reside broadly in a luminaire wherein the driver is configured to supply the power to the at least one LED at the substantially constant voltage.

A further feature or aspect of an embodiment is believed at the time of the filing of this patent application to possibly reside broadly in a luminaire, wherein the driver is configured to sense the input voltage.

Another feature or aspect of an embodiment is believed at the time of the filing of this patent application to possibly reside broadly in a luminaire, wherein the luminaire is a high bay, low bay, street light, or outdoor light.

Yet another feature or aspect of an embodiment is believed at the time of the filing of this patent application to possibly reside broadly in a luminaire, wherein the driver has a power factor correction (PFC) control circuit.

Still another feature or aspect of an embodiment is believed at the time of the filing of this patent application to possibly reside broadly in a luminaire, wherein the PFC control circuit is configured to:
  (i) draw an alternating current (AC) input current having a sinusoid waveform as line voltage; and
  (ii) sense a rectified input voltage from a full-wave rectifier at the PFC controller and output a direct current (DC) voltage and a DC current.

A further feature or aspect of an embodiment is believed at the time of the filing of this patent application to possibly reside broadly in a luminaire, wherein the PFC control circuit is a single stage PFC controller.

Another feature or aspect of an embodiment is believed at the time of the filing of this patent application to possibly reside broadly in a luminaire, wherein the PFC control circuit is selected from the group consisting of buck-boost, isolated flyback, non-isolated flyback, Sepic, and Cuk.

Yet another feature or aspect of an embodiment is believed at the time of the filing of this patent application to possibly reside broadly in a luminaire, wherein the driver has a ripple control circuit.

One feature or aspect of an embodiment is believed at the time of the filing of this patent application to possibly reside broadly in a luminaire, wherein the driver has a dimming interface.

Another feature or aspect of an embodiment is believed at the time of the filing of this patent application to possibly reside broadly in a luminaire, wherein the driver comprises: an output current regulation circuit configured to control an output current to match a control signal, DIM_command; a power factor correction (PFC) control circuit having a digital compensation block, a PFC controller, and a gate drive IC; wherein the PFC control circuit is configured and disposed to force an input AC current to track an input voltage waveform and to sense a rectified input voltage from a full-wave rectifier, MULT_in, and process it in a digital core of an uC, and output a new compensated MULT signal, MULT_out, for the PFC controller; and a passive voltage multiplier circuit disposed between the full-wave rectifier and an input of the PFC controller and configured to sense the input voltage waveform.

Yet another feature or aspect of an embodiment is believed at the time of the filing of this patent application to possibly reside broadly in a luminaire, wherein the driver comprises a ripple control circuit having a transient voltage suppressor (TVS) and a parallel resonant LC filter and being configured and disposed to receive DC current output by the PFC control circuit.

Still another feature or aspect of an embodiment is believed at the time of the filing of this patent application to possibly reside broadly in a luminaire comprising: at least one LED; a driver configured and disposed to supply power to the at least one LED at a substantially constant current or at a substantially constant voltage; the driver has a single power input terminal and wide input voltage range between about 100V and 528V; the driver is configured to supply power to the at least one LED at a substantially constant current or at a substantially constant voltage and comprises: an output current regulation circuit configured to control an output current to match a control signal, DIM_command; a power factor correction (PFC) control circuit having a digital compensation block, a PFC controller, and a gate drive IC; wherein the PFC control circuit is configured and disposed to force an input AC current to track an input voltage waveform and to sense a rectified input voltage from a full-wave rectifier, MULT_in, and process it in a digital core of an uC, and output a new compensated MULT signal, MULT_out, for the PFC controller; and a passive voltage multiplier circuit disposed between the full-wave rectifier and an input of the PFC controller and configured to sense the input voltage waveform.

A further feature or aspect of an embodiment is believed at the time of the filing of this patent application to possibly reside broadly in a luminaire, wherein the luminaire is a high bay, low bay, street light, or outdoor light.

Another feature or aspect of an embodiment is believed at the time of the filing of this patent application to possibly reside broadly in a luminaire, wherein the wide input voltage range of the driver is between about 120V and 480V.

Yet another feature or aspect of an embodiment is believed at the time of the filing of this patent application to possibly reside broadly in a luminaire, wherein the driver is configured to supply the power to the at least one LED at the substantially constant current.

Still another feature or aspect of an embodiment is believed at the time of the filing of this patent application to possibly reside broadly in a luminaire, wherein the driver is configured to supply the power to the at least one LED at the substantially constant voltage.

A further feature or aspect of an embodiment is believed at the time of the filing of this patent application to possibly reside broadly in a luminaire, further comprising at least one of a) and b), wherein a) and b) are: a) the driver has a ripple control circuit; and b) the driver has a dimming interface.

One feature or aspect of an embodiment is believed at the time of the filing of this patent application to possibly reside broadly in a light emitting diode (LED) driver configured for powering an LED having a wide input voltage range between about 100V and about 528V, high power factor, low total harmonic distortion (THD), and low output current ripple load. The LED driver has a single stage buck-boost type converter with output current regulation, an output current regulation circuit configured to control an output current to match a control signal, DIM_command, a ripple control circuit having a transient voltage suppressor (TVS) and a parallel resonant LC filter and being configured and disposed to receive DC current output by the single stage buck-boost type converter, take advantage of the high impedance at resonance, reduce the size of the resonant LC filter, improve efficiency, and minimize the output current ripple content and output capacitance, a power factor correction (PFC) control circuit having a digital compensation block, a PFC controller, and a gate drive IC, the PFC control circuit is configured and disposed to: (i) force an input AC current to track an input voltage waveform and achieve high power factor (PF) and a low THD; (ii) sense a rectified input voltage from a full-wave rectifier, MULT_in, and process it in a digital core of an uC, and output a new compensated MULT signal, MULT_out, for the PFC controller; and (iii) limit a maximum frequency of a gate drive signal, Gate_out, to reduce switching loss, improve efficiency, and improve electromagnetic interference. A passive voltage multiplier circuit is disposed between the full-wave rectifier and an input of the PFC controller and configured to sense the input voltage waveform. The input AC current has the same waveform as input voltage, achieving the high power factor and the low THD.

Another feature or aspect of an embodiment is believed at the time of the filing of this patent application to possibly reside broadly in the LED driver having the PFC control circuit configured to: (i) draw an alternating current (AC) input current having a sinusoid waveform as line voltage; (ii) sense a rectified input voltage from a full-wave rectifier at the PFC controller and output a direct current (DC) voltage and a DC current; (iii) achieve a low Total Harmonic Distortion (THD) of at most 10%; (iv) achieve high Power Factor (PF) of greater than 0.95; (v) achieve a low line frequency ripple on the output DC current of at most 10%; and (vi) control a maximum switching frequency, mitigate electromagnetic interference, and improving efficiency.

Yet another feature or aspect of an embodiment is believed at the time of the filing of this patent application to possibly reside broadly in the LED driver having the single stage PFC selected from the group consisting of buck-boost, isolated flyback, non-isolated flyback, Sepic, and Cuk.

Still another feature or aspect of an embodiment is believed at the time of the filing of this patent application to possibly reside broadly in a light emitting diode (LED) driver configured for powering at least one LED and having a wide input voltage range between about 100V and about 528V comprising a single stage buck-boost type power factor correction (PFC) front end and a digital compensation block in communication with the PFC. The digital compensation block is configured and disposed to: i) create a new multiply signal for a PFC control integrated circuit to improve a total harmonic distortion and a power factor for the buck-boost type PFC front end; ii) adaptively convert a signal (MULT_in) that is proportional to an input voltage to a nonlinear reference signal (MULT_out) for peak switching current, wherein the nonlinear reference signal cancels a nonlinear factor in an average input current and forces the average input current to follow the input voltage waveform to achieve high power factor and low THD; and iii) to be insensitive to a magnitude of the input voltage magnitude and solely compensate phase information for the nonlinear reference signal. The LED driver also has a digital maximum switching frequency limiting circuit configured and disposed to reduce switching loss, improve efficiency, and improve electromagnetic interference, a simple counting logic counter configured and disposed to sense and count a period of a switching cycle from a PFC IC, wherein upon the counted period of the switching becoming less than a set counter period a uC forces a gate drive to wait until the counted period of the switching period exceeds the set counter period which limits a maximum switching frequency, a line frequency ripple control circuit having a parallel resonant LC filter that is configured and disposed to reduce the size and power loss of the resonant LC filter. The parallel resonant LC filter is configured to have its resonant frequency two times a frequency of the input current, increase an impedance of the resonant LC filter at the output current ripple frequency, reduce a size requirement of the parallel resonant LC filter, and minimize an output AC ripple current and output capacitance. The LED driver also has an external current control loop having a dimming interface.

A further feature or aspect of an embodiment is believed at the time of the filing of this patent application to possibly reside broadly in the LED driver having the PFC control circuit configured to: (i) draw an alternating current (AC) input current having a sinusoid waveform as line voltage; (ii) sense a rectified input voltage from a full-wave rectifier at the PFC controller and output a direct current (DC) voltage and a DC current; (iii) achieve a low total harmonic distortion (THD) of at most 10%; (iv) achieve high power factor (PF) of greater than 0.95; (v) achieve a low line frequency ripple on the output DC current of at most 10%; and (vi) control a maximum switching frequency, mitigate electromagnetic interference, and improving efficiency.

Another feature or aspect of an embodiment is believed at the time of the filing of this patent application to possibly reside broadly in the LED driver having the single stage PFC selected from the group consisting of buck-boost, isolated flyback, non-isolated flyback, Sepic, and Cuk.

Yet another feature or aspect of an embodiment is believed at the time of the filing of this patent application to possibly reside broadly in a light emitting diode (LED) driver having a wide input voltage range between about 100V and about 528V and configured for powering an LED load at a substantially constant current. The LED driver has a single stage buck-boost type power factor correction (PFC) circuit, having a PFC controller, the buck-boost PFC circuit is configured to: (i) draw an alternating current (AC) input current having a sinusoid waveform as line voltage; (ii) sense a rectified input voltage from a full-wave rectifier at the PFC controller and output a direct current (DC) voltage and a DC current; (iii) achieve a low total harmonic distortion (THD) of at most 10%; (iv) achieve high power factor (PF) of greater than 0.95; (v) achieve a low line frequency ripple on the output DC current of at most 10%; and (vi) control a maximum switching frequency, mitigate electromagnetic interference, and improve efficiency.

Still another feature or aspect of an embodiment is believed at the time of the filing of this patent application to possibly reside broadly in the LED driver having the single stage PFC selected from the group consisting of buck-boost, isolated flyback, non-isolated flyback, Sepic, and Cuk.

A further feature or aspect of an embodiment is believed at the time of the filing of this patent application to possibly reside broadly in the LED driver comprising: an output current regulation circuit configured to control an output current to match a control signal, IM_command; a ripple control circuit having a transient voltage suppressor (TVS) and a parallel resonant LC filter and being configured and disposed to receive DC current output by the single stage buck-boost type PFC, take advantage of the high impedance at resonance, and reduce the size of the resonant LC filter, improve efficiency, and minimize the output current ripple content and output capacitance; the single stage buck-boost type PFC circuit has a gate drive IC and the PFC controller circuit is configured and disposed to: (i) force an input AC current to track an input voltage waveform and achieve high power factor (PF) and a low THD; (ii) sense a rectified input voltage from a full-wave rectifier, MULT_in, and process it in a digital core of an uC, and output a new compensated MULT signal, MULT_out, for the PFC controller; and (iii) limit a maximum frequency of a gate drive signal, Gate_out, to reduce switching loss, improve efficiency, and improve electromagnetic interference; a passive voltage multiplier circuit disposed between the full-wave rectifier and an input of the PFC controller and configured to sense the input voltage waveform; and wherein the input AC current has the same waveform as input voltage, achieving the high power factor and the low THD.

One feature or aspect of an embodiment is believed at the time of the filing of this patent application to possibly reside broadly in a single stage buck boost type LED driver that has wide input voltage.

Another feature or aspect of an embodiment is believed at the time of the filing of this patent application to possibly reside broadly in a single stage buck boost type LED driver that has substantially perfect power factor and THD.

Yet another feature or aspect of an embodiment is believed at the time of the filing of this patent application to possibly reside broadly in a single stage buck boost type LED driver that has very low output current ripple at twice the line frequency.

Still another feature or aspect of an embodiment is believed at the time of the filing of this patent application to possibly reside broadly in a digital compensation block to create a new multiply signal for PFC control IC to improve the THD and PF.

Another feature or aspect of an embodiment is believed at the time of the filing of this patent application to possibly reside broadly in a Digital compensation block to limit the maximum switching frequency of the PFC controller.

Yet another feature or aspect of an embodiment is believed at the time of the filing of this patent application to possibly reside broadly in a parallel resonant type of filter to suppress the LED output current.

Still another feature or aspect of an embodiment is believed at the time of the filing of this patent application to possibly reside broadly in a light emitting diode (LED) driver for powering an LED having a wide input voltage between about 100V and about 528V, a high power factor, a low THD, and a low output current ripple, comprising: a single stage power factor correction (PFC) circuit with output current regulation; a digital compensation block configured and disposed to create a new multiply signal for the PFC control IC to improve the THD and PF and to limit the maximum switching frequency of the PFC controller; and a ripple control circuit having a transient voltage suppressor, TVS, and a parallel resonant LC filter.

A further feature or aspect of an embodiment is believed at the time of the filing of this patent application to possibly reside broadly in a light emitting diode (LED) driver for powering an LED having a wide input voltage, high power factor, low THD, and low output current ripple load, comprising: a single stage buck power factor correction (PFC) circuit with output current regulation; a ripple control circuit having a transient voltage suppressor, TVS, and a parallel resonant LC filter and being configured and disposed to receive the DC voltage and the DC current output by the single stage PFC circuit; a digital compensation block having a PFC controller, the buck-boost type PFC circuit configured to (i) draw an alternating current (AC) input current having a first total harmonic distortion (THD), (ii) sense a rectified input voltage from a full-wave rectifier at the PFC controller, and (iii) output a direct current (DC) voltage and a DC current; a passive voltage multiplier circuit (i) disposed between the full-wave rectifier and an input of the PFC controller, and (ii) configured to sense rectified input voltage and a downstream isolation and regulator circuit configured to (i) receive the DC voltage and the DC current output by the buck-boost PFC circuit, based on the drawn AC current, and (ii) selectively switch, by a switch thereof, the DC current between different values based on a status position of the switch, to provide the substantially constant current of a desired value to the LED load. The LED driver may be configured to receive AC current in the voltage range of/wide range 100-528 V input. The LED driver may be configured for powering the LED having a wide input voltage, high power factor, low THD, and low output current ripple load at a substantially constant current.

The invention claimed is:

1. A luminaire comprising:
   a driver;
   at least one LED in electrical connection with the driver,
   the driver has a single power input terminal and wide input voltage range;
   wherein the wide input voltage range of the driver is between about 100V and 528V;
   the driver is configured to supply power to the at least one LED at a substantially constant current or at a substantially constant voltage;
   wherein the driver comprises:
   an output current regulation circuit configured to control an output current to match a control signal, DIM_command;
   a power factor correction (PFC) control circuit having a digital compensation block, a PFC controller, and a gate drive IC;
   wherein the PFC control circuit is configured and disposed to force an input AC current to track an input voltage waveform and to sense a rectified input voltage from a full-wave rectifier, MULT_in, and process it in a digital core of an uC, and output a new compensated MULT signal, MULT_out, for the PFC controller; and
   a passive voltage multiplier circuit disposed between the full-wave rectifier and an input of the PFC controller and configured to sense the input voltage waveform.

2. The luminaire of claim 1, wherein the driver comprises a ripple control circuit having a transient voltage suppressor (TVS) and a parallel resonant LC filter and being configured and disposed to receive DC current output by the PFC control circuit.

3. A luminaire comprising:
   at least one LED;
   a driver configured and disposed to supply power to the at least one LED at a substantially constant current or at a substantially constant voltage;
   the driver has a single power input terminal and wide input voltage range between about 100V and 528V;
   the driver is configured to supply power to the at least one LED at a substantially constant current or at a substantially constant voltage and comprises:
      an output current regulation circuit configured to control an output current to match a control signal, DIM_command;
      a power factor correction (PFC) control circuit having a digital compensation block, a PFC controller, and a gate drive IC;
      wherein the PFC control circuit is configured and disposed to force an input AC current to track an input voltage waveform and to sense a rectified input voltage from a full-wave rectifier, MULT_in, and process it in a digital core of an uC, and output a new compensated MULT signal, MULT_out, for the PFC controller; and
      a passive voltage multiplier circuit disposed between the full-wave rectifier and an input of the PFC controller and configured to sense the input voltage waveform.

4. The luminaire of claim 3, wherein the luminaire is a high bay, low bay, street light, or outdoor light.

5. The luminaire of claim 3, wherein the wide input voltage range of the driver is between about 120V and 480V.

6. The luminaire of claim 3, wherein the driver is configured to supply the power to the at least one LED at the substantially constant current.

7. The luminaire of claim 3, wherein the driver is configured to supply the power to the at least one LED at the substantially constant voltage.

8. The luminaire of claim 3, further comprising at least one of a) and b), wherein a) and b) are:
   a) the driver has a ripple control circuit; and
   b) the driver has a dimming interface.

9. A light emitting diode (LED) driver configured for powering at least one LED, the driver having a wide input voltage range between about 100V and about 528V, high power factor, low total harmonic distortion (THD), and low output current ripple load, comprising:
   a single stage buck-boost type converter with output current regulation;
   an output current regulation circuit configured to control an output current to match a control signal, DIM_command;
   a ripple control circuit having a transient voltage suppressor (TVS) and a parallel resonant LC filter and being configured and disposed to receive DC current output by the single stage buck-boost type converter, take advantage of the high impedance at resonance, reduce the size of the resonant LC filter, improve efficiency, and minimize the output current ripple content and output capacitance;
   a power factor correction (PFC) control circuit having a digital compensation block, a PFC controller, and a gate drive IC, the PFC control circuit is configured and disposed to:
      (i) force an input AC current to track an input voltage waveform and achieve high power factor (PF) and a low THD;
      (ii) sense a rectified input voltage from a full-wave rectifier, MULT_in, and process it in a digital core of an uC, and output a new compensated MULT signal, MULT_out, for the PFC controller; and
      (iii) limit a maximum frequency of a gate drive signal, Gate_out, to reduce switching loss, improve efficiency, and improve electromagnetic interference;
   a passive voltage multiplier circuit disposed between the full-wave rectifier and an input of the PFC controller and configured to sense the input voltage waveform; and
   wherein the input AC current has the same waveform as input voltage, achieving the high power factor and the low THD.

10. The LED driver of claim 9, wherein the PFC control circuit is configured to:
    (i) draw an alternating current (AC) input current having a sinusoid waveform as line voltage;
    (ii) sense a rectified input voltage from a full-wave rectifier at the PFC controller and output a direct current (DC) voltage and a DC current;
    (iii) achieve a low Total Harmonic Distortion (THD) of at most 10%;
    (iv) achieve high Power Factor (PF) of greater than 0.95;
    (v) achieve a low line frequency ripple on the output DC current of at most 10%; and
    (vi) control a maximum switching frequency, mitigate electromagnetic interference, and improving efficiency.

11. The LED driver of claim 9, wherein the single stage PFC is selected from the group consisting of buck-boost, isolated flyback, non-isolated flyback, Sepic, and Cuk.

12. A light emitting diode (LED) driver configured for powering at least one LED and having a wide input voltage range between about 100V and about 528V comprising:
    a single stage buck-boost type power factor correction (PFC) front end;
    a digital compensation block in communication with the PFC;
    the digital compensation block is configured and disposed to:
       i) create a new multiply signal for a PFC control integrated circuit to improve a total harmonic distortion and a power factor for the buck-boost type PFC front end;
       ii) adaptively convert a signal (MULT_in) that is proportional to an input voltage to a nonlinear reference signal (MULT_out) for peak switching current, wherein the nonlinear reference signal cancels a nonlinear factor in an average input current and forces the average input current to follow the input voltage waveform to achieve high power factor and low THD; and
       iii) to be insensitive to a magnitude of the input voltage magnitude and solely compensate phase information for the nonlinear reference signal;
    a digital maximum switching frequency limiting circuit configured and disposed to reduce switching loss, improve efficiency, and improve electromagnetic interference;

a simple counting logic counter configured and disposed to sense and count a period of a switching cycle from a PFC IC, wherein upon the counted period of the switching becoming less than a set counter period a uC forces a gate drive to wait until the counted period of the switching period exceeds the set counter period which limits a maximum switching frequency;

a line frequency ripple control circuit having a parallel resonant LC filter that is configured and disposed to reduce the size and power loss of the resonant LC filter;

wherein the parallel resonant LC filter is configured to have its resonant frequency two times a frequency of the input current, increase an impedance of the resonant LC filter at the output current ripple frequency, reduce a size requirement of the parallel resonant LC filter, and minimize an output AC ripple current and output capacitance; and an external current control loop having a dimming interface.

13. The LED driver of claim 12, wherein the PFC control circuit is configured to:
   (i) draw an alternating current (AC) input current having a sinusoid waveform as line voltage;
   (ii) sense a rectified input voltage from a full-wave rectifier at the PFC controller and output a direct current (DC) voltage and a DC current;
   (iii) achieve a low total harmonic distortion (THD) of at most 10%;
   (iv) achieve high power factor (PF) of greater than 0.95;
   (v) achieve a low line frequency ripple on the output DC current of at most 10%; and
   (vi) control a maximum switching frequency, mitigate electromagnetic interference, and improving efficiency.

14. The LED driver of claim 12, wherein the single stage PFC is selected from the group consisting of buck-boost, isolated flyback, non-isolated flyback, Sepic, and Cuk.

15. A light emitting diode (LED) driver having a wide input voltage range between about 100V and about 528V and configured for powering an LED load at a substantially constant current, comprising:
   a single stage buck-boost type power factor correction (PFC) circuit, having a PFC controller, the buck-boost PFC circuit is configured to:
      (i) draw an alternating current (AC) input current having a sinusoid waveform as line voltage;
      (ii) sense a rectified input voltage from a full-wave rectifier at the PFC controller and output a direct current (DC) voltage and a DC current;
      (iii) achieve a low total harmonic distortion (THD) of at most 10%;
      (iv) achieve high power factor (PF) of greater than 0.95;
      (v) achieve a low line frequency ripple on the output DC current of at most 10%; and
      (vi) control a maximum switching frequency, mitigate electromagnetic interference, and improve efficiency;
   the LED driver comprising:
      an output current regulation circuit configured to control an output current to match a control signal, DIM_command;
      a ripple control circuit having a transient voltage suppressor (TVS) and a parallel resonant LC filter and being configured and disposed to receive DC current output by the single stage buck-boost type PFC, take advantage of the high impedance at resonance, and reduce the size of the resonant LC filter, improve efficiency, and minimize the output current ripple content and output capacitance;
      the single stage buck-boost type PFC circuit has a gate drive IC and the PFC controller circuit is configured and disposed to:
         (i) force an input AC current to track an input voltage waveform and achieve high power factor (PF) and a low THD;
         (ii) sense a rectified input voltage from a full-wave rectifier, MULT_in, and process it in a digital core of an uC, and output a new compensated MULT signal, MULT_out, for the PFC controller; and
         (iii) limit a maximum frequency of a gate drive signal, Gate_out, to reduce switching loss, improve efficiency, and improve electromagnetic interference;
      a passive voltage multiplier circuit disposed between the full-wave rectifier and an input of the PFC controller and configured to sense the input voltage waveform; and
   wherein the input AC current has the same waveform as input voltage, achieving the high power factor and the low THD.

* * * * *